(12) United States Patent
Zhu et al.

(10) Patent No.: US 8,706,411 B2
(45) Date of Patent: Apr. 22, 2014

(54) METHOD AND SYSTEM FOR DISPATCHING VEHICLE

(75) Inventors: Jie Zhu, Guangdong (CN); Jialiang Chu, Guangdong (CN); Xiang He, Guangdong (CN); Chuan Liang, Guangdong (CN); Youwen Zhang, Guangdong (CN)

(73) Assignee: ChinaGPS Co., Ltd. (Shenzhen), Shenzhen, Guangdong (CN)

( * ) Notice: Subject to any disclaimer, the term of this patent is extended or adjusted under 35 U.S.C. 154(b) by 0 days.

(21) Appl. No.: 13/511,849

(22) PCT Filed: Sep. 8, 2010

(86) PCT No.: PCT/CN2010/076728
§ 371 (c)(1),
(2), (4) Date: May 24, 2012

(87) PCT Pub. No.: WO2011/063676
PCT Pub. Date: Jun. 3, 2011

(65) Prior Publication Data
US 2012/0290148 A1 Nov. 15, 2012

(30) Foreign Application Priority Data
Nov. 24, 2009 (CN) .......................... 2009 1 0109852

(51) Int. Cl.
*G01C 21/00* (2006.01)
*G01C 21/26* (2006.01)
*G01C 21/28* (2006.01)
*G01C 21/30* (2006.01)
*G01C 21/32* (2006.01)
*G01C 21/34* (2006.01)

(52) U.S. Cl.
USPC ........... 701/431; 701/408; 701/409; 701/410; 701/411; 701/412; 701/428; 701/429; 701/430; 701/468; 701/469; 701/470; 701/471; 701/472

(58) Field of Classification Search
USPC .................. 701/408–412, 428–431, 468–472
See application file for complete search history.

(56) References Cited

U.S. PATENT DOCUMENTS 6,339,745 B1 * 1/2002 Novik ........................... 701/431
7,701,363 B1 * 4/2010 Zlojutro ........................ 340/988

(Continued)

FOREIGN PATENT DOCUMENTS

| CN | 1758775 A | 4/2006 |
|----|-----------|--------|
| CN | 101013528 A | 8/2007 |

(Continued)

*Primary Examiner* — Mary Cheung
*Assistant Examiner* — Atul Trivedi
(74) *Attorney, Agent, or Firm* — Morris Manning & Martin LLP; Tim Tingkang Xia, Esq.

(57) ABSTRACT

A method and a system for dispatching vehicle are provided. The method for dispatching vehicle includes the following steps: A. obtaining the vehicle information, which includes vehicle numbers, vehicle states and relative positions; B. placing the vehicle icons corresponding to the vehicle numbers in the corresponding positions on the virtual line schedule map according to the vehicle states and the relative positions; C. displaying the virtual line schedule map refreshed via step B. The system for dispatching vehicle includes vehicle information obtaining unit, vehicle states judging and processing unit, displaying unit and dispatching unit. The system realize the visual vehicle dispatching method by utilizing the virtual line schedule map, so as to implement vehicle monitoring and dispatching.

8 Claims, 3 Drawing Sheets

(56) References Cited

U.S. PATENT DOCUMENTS

| | | | |
|---|---|---|---|
| 2002/0120394 A1* | 8/2002 | Rayne | 701/207 |
| 2003/0176967 A1* | 9/2003 | Chen | 701/213 |
| 2005/0052462 A1* | 3/2005 | Sakamoto et al. | 345/473 |
| 2005/0065716 A1* | 3/2005 | Timko et al. | 701/200 |
| 2005/0216182 A1* | 9/2005 | Hussain et al. | 701/200 |
| 2006/0142913 A1* | 6/2006 | Coffee et al. | 701/35 |
| 2006/0164259 A1* | 7/2006 | Winkler et al. | 340/944 |
| 2006/0235739 A1* | 10/2006 | Levis et al. | 705/9 |
| 2007/0173993 A1* | 7/2007 | Nielsen et al. | 701/35 |
| 2007/0271029 A1* | 11/2007 | Tzamaloukas | 701/200 |
| 2007/0294033 A1* | 12/2007 | Osentoski et al. | 701/213 |
| 2008/0109153 A1* | 5/2008 | Gueziec | 701/117 |
| 2008/0125964 A1* | 5/2008 | Carani et al. | 701/207 |
| 2008/0125965 A1* | 5/2008 | Carani et al. | 701/207 |
| 2008/0158017 A1* | 7/2008 | Christie et al. | 340/995.1 |
| 2009/0088924 A1* | 4/2009 | Coffee et al. | 701/33 |
| 2009/0157305 A1* | 6/2009 | Ding et al. | 701/207 |
| 2009/0210140 A1* | 8/2009 | Short et al. | 701/117 |
| 2009/0326991 A1* | 12/2009 | Wei et al. | 705/5 |
| 2010/0179844 A1* | 7/2010 | LaFergola et al. | 705/7 |
| 2010/0256836 A1* | 10/2010 | Mudalige | 701/2 |

FOREIGN PATENT DOCUMENTS

| | | |
|---|---|---|
| CN | 101572011 A | 11/2009 |
| JP | 2007057365 A | 3/2007 |
| KR | 20010035201 A | 5/2001 |

* cited by examiner

METHOD AND SYSTEM FOR DISPATCHING VEHICLE

FIELD OF THE INVENTION

The present invention relates generally to a method for dispatching vehicle, and specifically to a method and system for realizing the visual vehicle dispatching by utilizing a virtual line schedule map.

BACKGROUND OF THE UTILITY MODEL

In the traffic field, a number of vehicles such as buses run daily in specific lines at intervals. Now a management method by means of GPS is utilized by many bus companies, wherein, such method is mainly based on a GIS map where the position of the vehicle is displayed. Because of winding bus lines and other geographical location information which is also displayed in such GIS map, the displaying of the bus together with lines and other geographical location information will appear to be in a mess, which is neither conducive for the dispatcher to implement real-time, rapid and accurate positioning and monitoring on the vehicle, nor conducive for the dispatcher to make instantaneous and clear judging and dispatching. As such, a visual dispatching method based on a virtual line schedule map is necessary. FIG. 1 shows a vehicle schedule map based on the GIS map in the prior art. As shown in FIG. 1, in the GIS map, the bus lines are winding, and other geographical location information as well as the vehicle and the position information thereof are displayed. In this case where the GIS map is employed, the displaying of the vehicle position together with lines and other geographical location information will appear to be in a mess, which is neither conducive for the dispatcher to implement real-time, rapid and accurate positioning and monitoring on the vehicle, nor conducive for the dispatcher to make instantaneous and clear judging and dispatching.

SUMMARY OF THE UTILITY MODEL

As described above, the line information and other geographical location information are combined together in the prior art, which may lead to difficulty in identifying the effective information. As a result, it is neither conducive for the dispatcher to implement real-time, rapid and accurate positioning and monitoring on the vehicle, nor conducive for the dispatcher to make instantaneous and clear judging and dispatching. Therefore, the present invention provides a method and a system for realizing the visual vehicle dispatching by utilizing the virtual line schedule map.

For the above mentioned technical problem, the technical solution provided by the present invention is shown as follow:

a method for dispatching vehicle is provided, comprising the following steps:

A. obtaining vehicle information, which includes vehicle numbers, vehicle states and relative positions;

B. placing the vehicle icons corresponding to the vehicle numbers in the corresponding positions on a virtual line schedule map according to the vehicle states and the relative positions, wherein the virtual line schedule map includes a line table which is composed of multiple independent lines; each line includes up-line, down-line, line description and vehicle icons, and each vehicle icon corresponds to a specific encoded vehicle; and C. displaying the virtual line schedule map refreshed via step B.

In the method for dispatching vehicle of the present invention, the method further comprises the step: D. when there is a dispatching input command, receiving and identifying the dispatching input command, implementing corresponding dispatching operations on the displayed virtual line schedule map according to the dispatching input command, generating a dispatching signal based on the dispatching input command and feeding back the dispatching signal to an external system; wherein the dispatching signal comprises the original position, the number and the destination of the dispatched vehicle.

In the method for dispatching vehicle of the present invention, the vehicle information is obtained in real time or regularly.

In the method for dispatching vehicle of the present invention, each line further comprises an initial point box, a terminal point box and initial point and terminal point descriptions.

In the method for dispatching vehicle of the present invention, the virtual line schedule map further comprises a temporary mission box, a parking box and a maintenance box, and the step B further comprises:

B1. judging the vehicle states, wherein the vehicle states comprises up-state, down-state, on-the-initial-point state, on-the-terminal-point state (4), temporary mission state, in-maintenance state and parking state;

B2. if the vehicle state is the up-state or the down-state, placing the vehicle icon in the corresponding position in the up-line or the down-line based on the relative position of the vehicle and the principle of ratio; if the vehicle state is the on-the-initial-point state or the on-the-terminal-point state, placing the vehicle icon in the corresponding initial point box or terminal point box based on the principle of sequence; if the vehicle state is the temporary mission state, the in-maintenance state or the parking state, placing the vehicle icon in the corresponding temporary mission box or maintenance box or parking box.

In the method for dispatching vehicle of the present invention, the step D further comprises:

D1. receiving and identifying the dispatching input command, and locking the vehicle icon to be dispatched based on the dispatching input command; D2. transferring the locked vehicle icon to the destination assigned by the dispatching input command; and D3. feeding back the dispatching signal to the external system, so as to make the vehicle implement the dispatching command in time.

Preferably, the initial point box and the terminal point box are in the shape of rectangle or rounded rectangle; the up-line is connected to the terminal point box on the top right corner and to the initial point box on the top left corner respectively, and its direction is from the initial point to the terminal point; the down-line is connected to the terminal point box on the lower right corner and to the initial point box on the lower left corner respectively, and its direction is from the terminal point to the initial point; the line description comprises a line name, the number of vehicles in respective vehicle states and the total number of vehicles, wherein the line description is located at the middle of the line between the up-line and the down-line; the initial point description and the terminal point description are located between the up-line and the down-line and adjacent to the initial point and the terminal point respectively; the vehicle icon has a shape similar to that of the vehicle, and it comprises a vehicle light, wheels and the vehicle number.

The vehicle states are indicated by different colors for the vehicle icon.

The vehicle information also comprises vehicle security information which comprises a vehicle velocity and accident information; if the vehicle is in the circumstance of overspeed, accident or their combination, the vehicle icon is set to be in a state of twinkling; and the vehicle security information has the priority to be reported.

The present invention also provides a system for dispatching vehicle, comprising a vehicle information obtaining unit, a vehicle states judging and processing unit, a displaying unit and a dispatching unit; wherein, the vehicle information obtaining unit is operable to obtain vehicle information from an external system, and the vehicle information comprises vehicle numbers, vehicle states and relative positions; the vehicle information obtaining unit is operable to obtain vehicle information from an external system, and the vehicle information comprises vehicle numbers, vehicle states and relative positions;

the vehicle states judging and processing unit is operable to place the vehicle icons corresponding to the vehicle numbers in the corresponding positions on a virtual line schedule map according to the vehicle states and the relative positions, the virtual line schedule map includes a line table which is composed of multiple independent lines; each line includes up-line, down-line, line description and vehicle icons, and each vehicle icon corresponds to a specific encoded vehicle;

the displaying unit is operable to display the virtual line schedule map processed by the vehicle states judging and processing unit; and the dispatching unit is operable to receive and identify a dispatching input command, lock the vehicle icon to be dispatched on the virtual line schedule map based on the dispatching input command, transfer the locked vehicle icon to a destination assigned by the dispatching input command, generate a dispatching signal based on the dispatching input command, and feed back the dispatching signal to the external system; wherein the dispatching signal comprises the original position, the number and the destination of the dispatching vehicle.

In the system for dispatching vehicle of the present invention, the virtual line schedule map further comprises a temporary mission box, a parking box and a maintenance box; the vehicle states comprises up-state, down-state, on-the-initial-point state, on-the-terminal-point state, temporary mission state, in-maintenance state and parking state; each line also comprises an initial point box, a terminal point box and initial point and terminal point descriptions.

If the vehicle state is the up-state or the down-state, the vehicle icon is placed in the corresponding position in the up-line or the down-line by the vehicle states judging and processing unit (200) based on the relative positions of the vehicle and the principle of ratio; if the vehicle state is the on-the-initial-point state or the on-the-terminal-point state, the vehicle icon is placed in the corresponding initial point box or the terminal point box by the vehicle states judging and processing unit based on the principle of sequence; if the vehicle state is the temporary mission state, the in-maintenance state or the parking state, the vehicle icon is placed in the corresponding temporary mission box or maintenance box or parking box by the vehicle states judging and processing unit.

Preferably, the initial point box and the terminal point box are in the shape of rectangle or rounded rectangle; the up-line is connected to the terminal point box on the top right corner and to the initial point box on the top left corner respectively, and its direction is from the initial point to the terminal point; the down-line is connected to the terminal point box on the lower right corner and to the initial point box on the lower left corner respectively, and its direction is from the terminal point to the initial point; the line description comprises a line name, the number of vehicles in respective vehicle states and the total number of vehicles, wherein the line description is located at the middle of the line between the up-line and the down-line; the initial point description and the terminal point description are located between the up-line and the down-line and adjacent to the initial point and the terminal point respectively; the vehicle icon has a shape similar to that of the vehicle, and it comprises a vehicle light, wheels and the vehicle number.

The vehicle states are indicated by different colors for the vehicle icon.

The vehicle information also comprises vehicle security information which comprises a vehicle velocity and accident information; if the vehicle is in the circumstance of over-speed, accident or their combination, the vehicle icon is set to be in a state of twinkling; and the vehicle security information has the priority to be reported.

When implementing the method and the system for realizing the visual vehicle dispatching by utilizing the virtual line schedule map, the following advantageous effects can be achieved: the line information and the geographic position information of the vehicle can be displayed directly and clearly on the virtual line schedule map, so as to facilitate the dispatcher to implement real-time, rapid and accurate positioning and monitoring, and make instantaneous and clear judging and dispatching when necessary; besides, the dispatching operations of the dispatcher can be greatly simplified.

BRIEF DESCRIPTION OF THE DRAWINGS

The present invention is further described with reference to the accompanying drawings and embodiments in the following. In the figures.

DETAILED DESCRIPTION OF THE PREFERRED EMBODIMENT

In order to make the objective, technical solution and advantages of the present invention more clear, the present invention will be further explained in detail with reference to the accompanying drawings and embodiments in the following. It is understood that the specific embodiments described here are only for illustration instead of limitation of the present invention.

Figure 1:
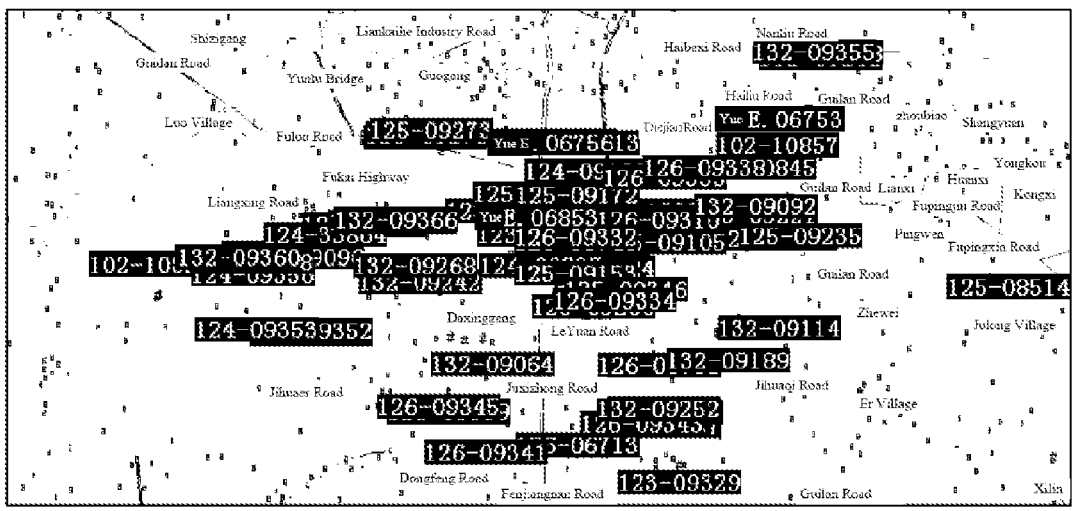
FIG. 1 shows a vehicle schedule map based on a GIS map in the prior art.
Figure 2:
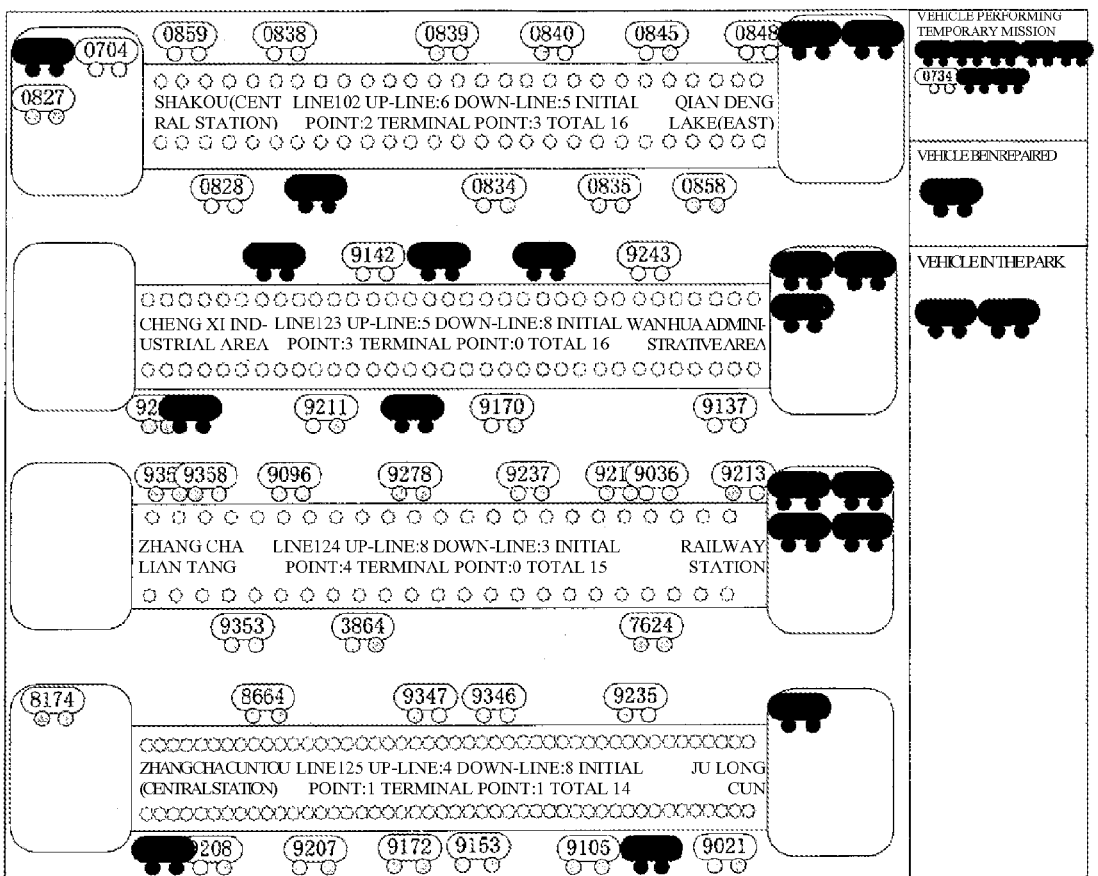
FIG. 2 shows a schematic view of a virtual line schedule map according to an embodiment of the present invention.

FIG. 2 shows a schematic view for an embodiment of a virtual line schedule map according to an embodiment of the present invention. The virtual line schedule map in such embodiment comprises a line table, a temporary mission box, a parking box and a maintenance box. The line table is composed of multiple independent lines, each of which comprises an initial point box, a terminal point box, an up-line, a down-line, line description, initial point and terminal point descriptions and vehicle icons. Wherein, each vehicle icon corresponds to a specific encoded vehicle. The initial point box and the terminal point box are in the shape of rectangle or rounded rectangle. The up-line is connected to the terminal point box on the top right corner and to the initial point box on the top left corner respectively, and its direction is from the initial point box to the terminal point box. The down-line is connected to the terminal point box on the lower right corner respectively and to the initial point box on the lower left corner respectively, and its direction is from the terminal point box to the initial point box. The line description located at the middle of the line between the up-line and the down-line comprises a line name, the number of vehicles in respective vehicle states and the total number of vehicles. The initial point description and the terminal point description are located between the up-line and the down-line, and further adjacent to the initial point box and the terminal point box respectively. The vehicle icon has a shape similar to that of the vehicle, and it comprises a vehicle light, wheels and the vehicle number.

The position of the vehicle icon on the virtual line schedule map is determined by the position of its corresponding vehicle on the road. Specifically, the vehicle icon is placed in the corresponding position in the up-line or the down-line based on the ratio of the running route to the total route of the corresponding vehicle. For example, when a vehicle has travelled for half the distance in the up-direction, the corresponding vehicle icon is placed in the middle of the up-line to show the current position of the vehicle.

As shown in FIG. 2, the number of the vehicles in respective vehicle states in each line and the total number of vehicles are both shown between the up-line and the down-line of such line. Each line comprises an initial point and a terminal point, as well as an up-line and a down-line. The stops except from the initial point and the terminal point respectively in the up-line and the down-line may be the same as each other or be different from each other. No. 102 in the figure represents the line: Qiandeng Lake (east) <-> Shakou (central station); No. 123 represents the line: Wanhua Administrative Area <-> Chengxi Industrial Area; No. 124 represents the line: Railway Station <-> Zhangchaliantang; No. 125 represents the line: Julong Cun <-> Zhangchacuntou (central station). For line 102, there are 6 vehicles in the up-state, 5 vehicles in the down-state, 2 vehicles on the initial point (corresponding to "initial point" in the figure) and 3 vehicles on the terminal point (corresponding to "terminal point" in the figure).

Figure 3:
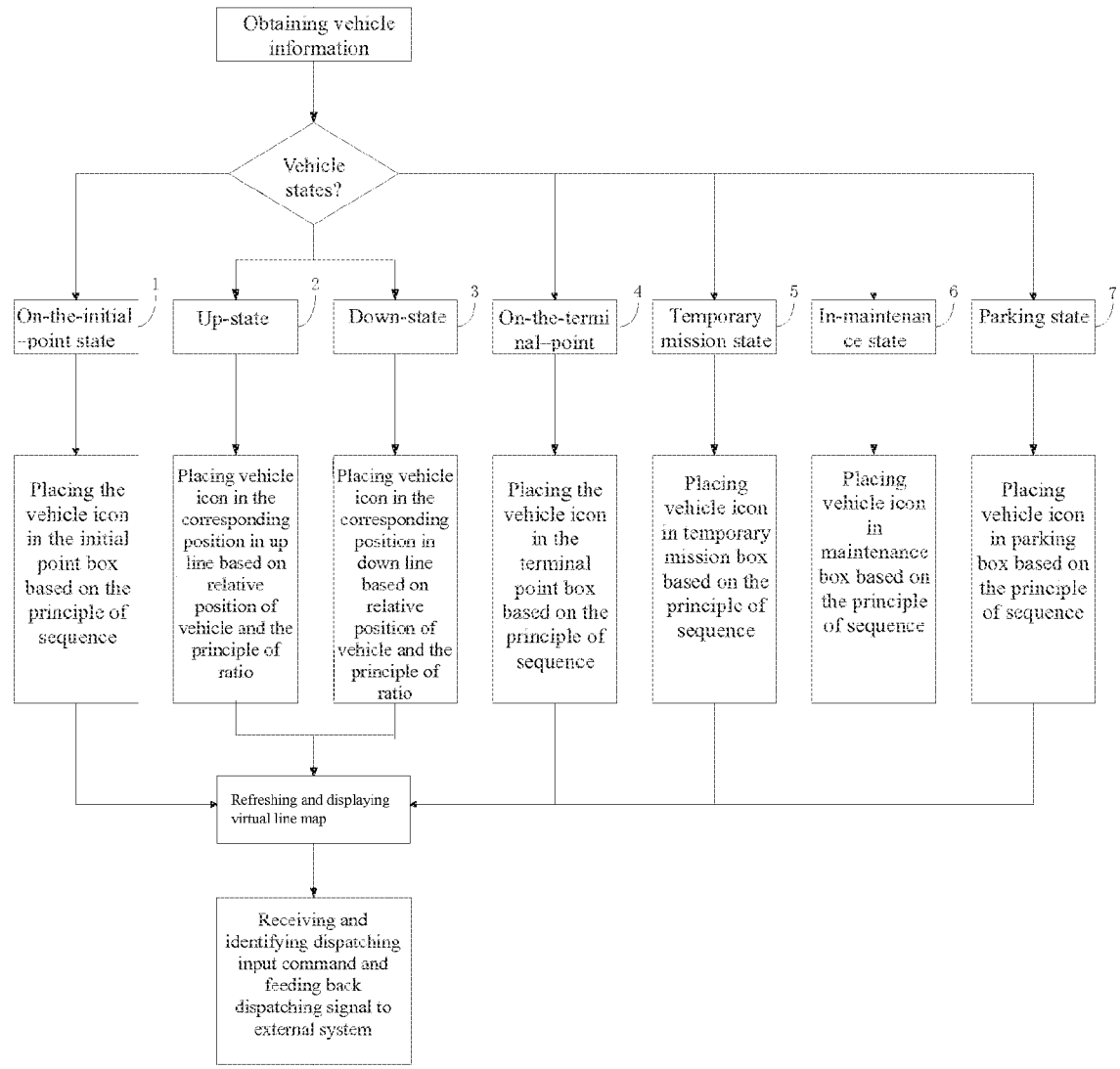
FIG. 3 shows a flowchart of the method for realizing visual vehicle dispatching by utilizing a virtual line schedule map according to an embodiment of the present invention.

FIG. 3 shows a flowchart of the method for dispatching vehicle according to an embodiment of the present invention, and the method comprises the following steps:

A. Vehicle information is obtained from an external system which comprises vehicle numbers, vehicle states and relative positions. The vehicle states comprises up-state 2, down-state 3, on-the-initial-point state 1, on-the-terminal-point state 4, temporary mission state 5, in-maintenance state 6 and parking state 7.

B. The vehicle icons corresponding to the vehicle numbers are placed in the corresponding positions on a virtual line schedule map according to the vehicle states and the relative positions.

C. The virtual line schedule map refreshed via step B is displayed.

The external system comprises a vehicular GPS terminal and a communication processor. The vehicular GPS terminal is operable to obtain the position information of a vehicle, and the communication processor is operable to obtain the state information of vehicle, receive dispatching information and inform the vehicle thereafter. Each vehicle is provided with the vehicular GPS terminal and the communication processor. In step A, a vehicle information obtaining unit 100 is operable to obtain the position information and the state information of the vehicle from the external system in real time or regularly. The up-state 2, down-state 3, on-the-initial-point state 1 and on-the-terminal-point state 4 of the vehicle states represent a service state. The temporary mission state 5, in-maintenance state 6 and parking state 7 represent a non-service state. The non-service states may comprise many options, such as a vehicle chartering service. Different vehicle states are indicated by the vehicle icons with different colors.

The vehicle information also comprises vehicle security information which comprises a vehicle velocity, accident information and so on. If the vehicle is in the circumstance of overspeed, accident or under-report for a long time, the vehicle icon is marked with a specific color and set to be in a state of twinkling at the same time. It is preferred to report the vehicle security information so as to prevent accidents as soon as possible. Herein, the accident is related to many options such as traffic accident, hijack, theft, abnormal change of oil mass (such as oil theft) and so on.

In step B, if the vehicle state is the up-state 2 or the down-state 3, the vehicle icon is placed in the corresponding position in the up-line or down-line based on the relative position of the vehicle and the principle of ratio. If the vehicle state is the on-the-initial-point state 1 or the on-the-terminal-point state 4, the vehicle icon is placed in the corresponding initial point box or the terminal point box based on the principle of sequence. If the vehicle state is the temporary mission state 5, the in-maintenance state 6 or the parking state 7, the vehicle icon is placed in the corresponding temporary mission box or maintenance box or parking box. As shown in FIG. 2, the vehicle icon with the number of 0827 in line 102 is placed in the terminal point box; the vehicle icon with the number of 0838 is placed in the up-line and adjacent to the terminal point "Shakou (central station)"; the vehicle icon with the number of 0835 is placed in the down-line and adjacent to the initial point "Qiandeng Lake (east)". The position of the vehicle icon on the virtual line schedule map is determined by the ratio of the actual running position of the corresponding vehicle to the total distance. Similarly, if the vehicle state is the temporary mission state or in-maintenance state or parking state, the vehicle icon corresponding to the vehicle will be placed in the corresponding box.

The method for dispatching vehicle in the embodiment of the present invention further comprises the following step: D. when there is a dispatching input command, it is received and identified. Subsequently, a dispatching signal which is fed back to the external system thereafter is generated based on the dispatching input command. Wherein, the dispatching signal comprises the original position, the number and the destination of the dispatching vehicle. The number and the destination of the dispatching vehicle are determined by the dispatching input command. The dispatching signal is transmitted to and processed by the communication processor, so as to inform the vehicle to implement the dispatching command in time.

For example, if the dispatcher is dispatching the vehicle with the number of 9237 in line 124 in FIG. 2 to make the vehicle implement a temporarily assigned mission, the destination of the vehicle will be the temporary mission box that is also the destination required by the dispatching command. In the present invention, the vehicle icon on the virtual line schedule map is firstly locked and transferred into the temporary mission box. In the method of this embodiment, the dispatching signal trigged by the dispatching input command is transmitted to the external system. When the vehicle receives the dispatching signal, it implements the dispatching mission.

Figure 4:
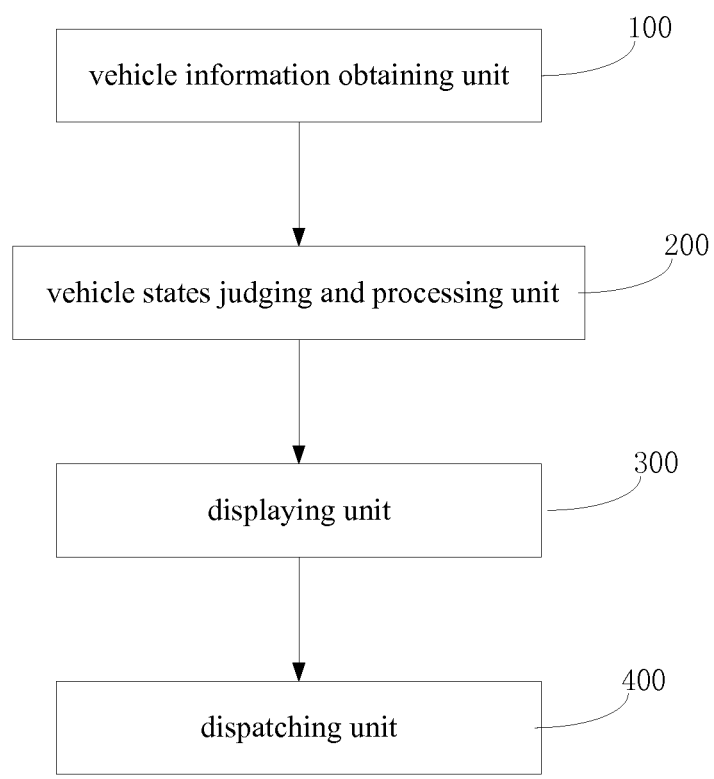
FIG. 4 shows a block diagram of a system for realizing visual vehicle dispatching by utilizing a virtual line schedule map according to an embodiment of the present invention.

FIG. 4 is a block diagram of a system for dispatching vehicle according to an embodiment of the present invention. The system comprises a vehicle information obtaining unit 100, a vehicle states judging and processing unit 200, a displaying unit 300 and a dispatching unit 400.

The vehicle information obtaining unit 100 is operable to obtain vehicle information from an external system. The vehicle information comprises vehicle numbers, vehicle states and relative positions. The vehicle states comprises up-state 2, down-state 3, on-the-initial-point state 1, on-the-terminal-point state 4, the temporary mission state 5, in-maintenance state 6 and parking state 7.

The vehicle states judging and processing unit 200 is operable to place the vehicle icons corresponding to the vehicle numbers in the corresponding positions on a virtual line schedule map according to the vehicle states and the relative positions.

If the vehicle state is the up-state 2 or the down-state 3, based on the relative position of the vehicle and the principle of ratio, the vehicle icon is placed in the corresponding position in the up-line or the down-line by the vehicle states judging and processing unit 200. If the vehicle state is the on-the-initial-point state 1 or on-the-terminal-point state 4, the vehicle icon is placed in the corresponding initial point box or the terminal point box by the vehicle states judging and processing unit 200 based on the principle of sequence. If the vehicle state is the temporary mission state 5, in-maintenance state 6 or parking state 7, the vehicle icon is placed in the corresponding temporary mission box or maintenance box or parking box by the vehicle states judging and processing unit 200.

The up-state 2, down-state 3, on-the-initial-point state 1 and on-the-terminal-point state 4 of the vehicle states represent a service state. The temporary mission state 5, in-maintenance state 6 and parking state 7 represent a non-service state. The non-service states may comprise many options, such as a vehicle chartering service. Different vehicle states are indicated by the vehicle icons with different colors.

The vehicle information also comprises vehicle security information which comprises a vehicle velocity, accident information and so on. If the vehicle is in the circumstance of overspeed, accident or under-report for a long time, the vehicle icon is marked with a specific color and set to be in a state of twinkling at the same time. It is preferred to report the vehicle security information so as to prevent accidents as soon as possible. Herein, the accident is related to many options such as traffic accident, hijack, theft, abnormal change of oil mass (such as oil theft) and so on.

The displaying unit 300 is operable to display the virtual line schedule map processed by the vehicle states judging and processing unit 200. An appropriate displaying apparatus may be selected as the displaying unit 300, such as an LED displaying screen.

The dispatching unit 400 is operable to receive and identify dispatching input command, lock the vehicle icon to be dispatched based on the dispatching input command, transfer the locked vehicle icon to the destination assigned by the dispatching input command and feed back the dispatching signal to the external system. For example, if a dispatcher is dispatching the vehicle with the number of 9243 in line 123 in FIG. 2 to make the vehicle implement a temporarily assigned mission, it is needed to lock such vehicle icon on the virtual schedule map and transfer it into the temporary mission box. The system of the present embodiment transmits such dispatching input command to the vehicular GPS terminal of the vehicle. When the vehicle receives the information, it implements the dispatching mission.

In the present invention, the method and the system realize the visual vehicle dispatching by utilizing the virtual line schedule map, wherein the line information and the geographic position information of the vehicle can be displayed directly and clearly on the virtual line schedule map. In this way, it is convenient for the dispatcher to implement real-time, rapid and accurate positioning and monitoring, and make instantaneous and clear judging and dispatching. Besides, the dispatching operations of the dispatcher are also greatly simplified.

The above-mentioned description is only a preferred embodiment of the present invention which is not used as the limitation of the present invention. Any modifications, equivalents and improvements made in the spirit and principle of the present invention should be included in the scope of protection of the present invention.

The invention claimed is:

1. A method for dispatching vehicle, comprising the following steps:
   A. obtaining, in real time or regularly, vehicle information, which includes vehicle numbers, vehicle states and relative positions;
   B. placing the vehicle icons corresponding to the vehicle numbers in the corresponding positions on a virtual line schedule map according to the vehicle states and the relative positions, wherein the virtual line schedule map includes a line table which is composed of multiple independent lines; each line includes up-line, down-line, line description and vehicle icons, and each vehicle icon corresponding to a specific encoded vehicle, each line also comprises an initial point box and a terminal point box; the up-line has a direction from the initial point box to the terminal point box, and the down-line has a direction from the terminal point box to the initial point box; a position of the vehicle icon on the virtual line schedule map is determined by a position of its corresponding vehicle on a road, the vehicle icon is placed in a corresponding position in the up-line or the down-line based on a ratio of a running route to a total route of the corresponding vehicle;
   C. displaying the virtual line schedule map refreshed via step B; and
   D. when there is a dispatching input command, receiving and identifying the dispatching input command and implementing corresponding dispatching operations on the displayed virtual line schedule map according to the dispatching input command to generate a dispatching signal based on the dispatching input command and to feed back the dispatching signal to an external system, wherein the external system comprises a vehicular GPS terminal and a communication processor provided on each vehicle;
   wherein the step D comprises:
      D1. receiving and identifying the dispatching input command, and locking the vehicle icon to be dispatched based on the dispatching input command;
      D2. transferring the locked vehicle icon to the destination assigned by the dispatching input command; and
      D3. feeding back the dispatching signal to the external system, so as to make the vehicle implement the dispatching command in time.

2. The method for dispatching vehicle of claim 1, wherein the dispatching signal comprises the original position, the number and the destination of the dispatching vehicle, and the dispatching signal is transmitted to and processed by the communication processor, so as to inform the vehicle to implement a dispatching command in time.

3. The method for dispatching vehicle of claim 1, wherein each line also comprises initial point and terminal point descriptions.

4. The method for dispatching vehicle of claim 3, wherein,
the initial point box and the terminal point box are in the shape of rectangle or rounded rectangle;
the up-line is connected to the terminal point box on the top right corner and to the initial point box on the top left corner respectively, and its direction is from the initial point to the terminal point;
the down-line is connected to the terminal point box on the lower right corner and to the initial point box on the lower left corner respectively, and its direction is from the terminal point to the initial point;
the line description comprises a line name, the number of vehicles in respective vehicle states and the total number of vehicles, wherein the line description is located at the middle of the line between the up-line and the down-line;
the initial point description and the terminal point description are located between the up-line and the down-line, and adjacent to the initial point and the terminal point respectively;
the vehicle icon has a shape similar to that of the vehicle, and it comprises a vehicle light, wheels and the vehicle number;
the vehicle states are indicated by different colors for the vehicle icon;
the vehicle information also comprises vehicle security information which comprises a vehicle velocity and accident information; if the vehicle is in the circumstance of overspeed, accident or their combination, the vehicle icon is set to be in a state of twinkling; and the vehicle security information has the priority to be reported.

5. The method for dispatching vehicle of claim 1, wherein the virtual line schedule map also comprises a temporary mission box, a parking box and a maintenance box, and the step B further comprises:
B1. judging the vehicle states, wherein the vehicle states comprises up-state (2), down-state (3), on-the-initial-point state (1), on-the-terminal-point state (4), temporary mission state (5), in-maintenance state (6) and parking state (7);
B2. if the vehicle state is the up-state (2) or the down-state (3), placing the vehicle icon in the corresponding position in the up-line or the down-line based on the relative position of the vehicle and by the principle of ratio;
if the vehicle state is the on-the-initial-point state (1) or the on-the-terminal-point state (4), placing the vehicle icon in the corresponding initial point box or the terminal point box based on the principle of sequence;
if the vehicle state is the temporary mission state (5), the in-maintenance state (6) or the parking state (7), placing the vehicle icon in the corresponding temporary mission box or maintenance box or parking box.

6. A system for dispatching vehicle, comprising a vehicle information obtaining unit (100), a vehicle states judging and processing unit (200), a displaying unit (300) and a dispatching unit (400); wherein,
the vehicle information obtaining unit (100) is operable to obtain vehicle information from an external system, wherein the vehicle information comprises vehicle numbers, vehicle states and relative position, and the external system comprises a vehicular GPS terminal and a communication processor provided on each vehicle;
the vehicle states judging and processing unit (200) is operable to place the vehicle icons corresponding to the vehicle numbers in the corresponding positions on a virtual line schedule map according to the vehicle states and the relative positions, the virtual line schedule map includes a line table which is composed of multiple independent lines; each line includes up-line, down-line, line description and vehicle icons, and each vehicle icon corresponds to a specific encoded vehicle, each line also comprises an initial point box and a terminal point box; the up-line has a direction from the initial point box to the terminal point box, and the down-line has a direction from the terminal point box to the initial point box; a position of the vehicle icon on the virtual line schedule map is determined by a position of its corresponding vehicle on a road, the vehicle icon is placed in a corresponding position in the up-line or the down-line based on a ratio of a running route to a total route of the corresponding vehicle;
the displaying unit (300) is operable to display the virtual line schedule map processed by the vehicle states judging and processing unit (200); and
the dispatching unit (400) is operable to receive and identify a dispatching input command, and implementing corresponding dispatching operations on the displayed virtual line schedule map according to the dispatching input command, wherein the dispatching operations comprise:
locking the vehicle icon to be dispatched on the virtual line schedule map based on the dispatching input command,
transferring the locked vehicle icon to the destination assigned by the dispatching input command,
generating a dispatching signal based on the dispatching input command, and
feeding back the dispatching signal to the external system such that the dispatching signal is transmitted to and processed by the communication processor, so as to inform the vehicle to implement a dispatching command in time;
wherein the dispatching signal comprises the original position, the number and the destination of the dispatching vehicle.

7. The system for dispatching vehicle of claim 6, wherein the virtual line schedule map also comprises a temporary mission box, a parking box and a maintenance box; the vehicle states comprises up-state (2), down-state (3), on-the-initial-point state (1), on-the-terminal-point state (4), temporary mission state (5), in-maintenance state (6) and parking state (7); each line comprises initial point and terminal point descriptions;
if the vehicle state is the up-state (2) or the down-state (3), the vehicle icon is placed in the corresponding position in the up-line or the down-line by the vehicle states judging and processing unit (200) based on the relative position of the vehicle and the principle of ratio;
if the vehicle state is the on-the-initial-point state (1) or the on-the-terminal-point state (4), the vehicle icon is placed in the corresponding initial point box or the terminal point box by the vehicle states judging and processing unit (200) based on the principle of sequence;
if the vehicle state is the temporary mission state (5), the in-maintenance state (6) or the parking state (7), the vehicle icon is placed in the corresponding temporary mission box or maintenance box or parking box by the vehicle states judging and processing unit (200).

8. The system for dispatching vehicle of claim 7, wherein, the initial point box and the terminal point box are in the shape of rectangle or rounded rectangle;

the up-line is connected to the terminal point box on the top right corner and to the initial point box on the top left corner respectively, and its direction is from the initial point to the terminal point;

the down-line is connected to the terminal point box on the lower right corner and to the initial point box on the lower left corner respectively, and its direction is from the terminal point to the initial point;

the line description comprises a line name, the number of vehicles in respective vehicle states and the total number of vehicles, wherein the line description is located at the middle of the line between the up-line and the down-line;

the initial point description and the terminal point description are located between the up-line and the down-line, and adjacent to the initial point and the terminal point respectively;

the vehicle icon has a shape similar to that of the vehicle, and it comprises a vehicle light, wheels and the vehicle number;

the vehicle states are indicated by different colors for the vehicle icon;

the vehicle information also comprises vehicle security information which comprises a vehicle velocity and accident information; if the vehicle is in the circumstance of overspeed, accident or their combination, the vehicle icon is set to be in a state of twinkling; and the vehicle security information has the priority to be reported.

* * * * *